United States Patent Office 2,748,105
Patented May 29, 1956

2,748,105

PROCESS FOR CHLORINATING ETHYLENE POLYMERS IN SOLUTION

Wilhelm Becker and Otto Bayer, Leverkusen-Bayerwerk, Germany, assignors to Farbenfabriken Bayer Aktiengesellschaft, Leverkusen, Germany, a corporation of Germany No Drawing. Application December 29, 1951, Serial No. 264,237

Claims priority, application Germany January 18, 1951

3 Claims. (Cl. 260—85.3)

This invention relates to chlorinated polymers of ethylene and to processes for manufacturing these products.

From the prior art teachings it is known to halogenate ethylene polymers melting between 100 and 120° C. and having molecular weights above 2000, in solvents which are not reactive towards halogen. As halogen-resistant solvents, for instance, carbon tetrachloride, chloroform and trichloroethene are described. However, the use of carbon tetrachloride only has become known in the prior art process. Though a clear solution of the ethylene polymers is obtained at the boiling temperatures of said polymers, the chlorination product precipitates in form of gels, independently of the chlorination temperature applied, as soon as the amount of chlorine absorbed exceeds 40%. Therefore, the production of uniform products of a higher chlorine content than 40% which are of special technical importance, involves considerable difficulties or is even impossible at all when using carbon tetrachloride as solvent. Furthermore, the isolation of the chlorination products from the reaction solutions is rather troublesome and can hardly be accomplished on a technical scale, since the higher chlorinated products are not present in form of their solutions, but as gel-like precipitates and render the separation of the solvent therefrom extraordinarily difficult. The use of chloroform as solvent does not result in clear solutions of the starting materials even at temperatures up to the boiling point of chloroform and provides no smooth chlorination. The same applies to the other previously proposed solvents which are not suitable for producing higher chlorinated uniform products of ethylene polymers.

It is one of the objects of the present invention to provide ethylene polymers of very high chlorine contents.

It is a further object of the invention to provide an improved technique for chlorinating polymers of ethylene which gives a substantial increase in the chlorine content of the resulting products.

Other objects will appear hereinafter.

These objects are accomplished by chlorinating ethylene polymers as will be described more fully below.

In accordance with the present invention we have found that excellent and uniform chlorination products which remain in solution up to the end of the chlorination process and which may be isolated from the chlorination solutions in a technically simple and convenient manner, are obtained by subjecting polymers of ethylene or mixtures of polyethylene and other polymeric vinyl compounds in chloroform to the action of chlorine at temperatures exceeding at least at the beginning of the chlorination process the boiling point of chloroform. The chlorination temperature conditions may be controlled by adding to the chloroform chlorine-resistant solvents which in mixture with chloroform have a higher boiling point than chloroform, and/or carrying out chlorination in chloroform under superatmospheric pressure.

Carbon tetrachloride has proved to be an especially suitable chlorine-resistant solvent to be added to chloroform according to the invention. The use of other high molecular weight compounds absorbing chlorine in the solutions of polymers to be subjected to the action of chlorine according to the invention, results in novel products of valuable and stable properties.

In practicing the process of the invention under the foregoing conditions both the starting materials and the chlorination products completely remain in solution from the very beginning up to the end of the chlorination process. After the chlorine absorbed in the process amounts to about 20%, further chlorination may proceed at lower temperatures, for instance, at room temperature, without gelatinization of the chlorination solution occurring thereby. Higher boiling solvents which are not reactive towards chlorine, for instance, carbon tetrachloride, trichloroethylene and chlorobenzene, are preferably employed as solvents elevating the boiling point of chloroform. However, it is advantageous to use solvents the boiling points of which are not too high, in order to avoid difficulties in the drying step. A solvent mixture consisting of chloroform and carbon tetrachloride wherein the content of chloroform may be decreased to 10%, has proved to be especially suitable for this purpose. Said solvent mixture does not give rise to turbidity in the chlorination solutions at the reaction temperature applied. Furthermore, the chlorination products are in solution up to the end of the chlorination process also at room temperature.

Suitable chlorination agents according to the invention include besides chlorine the known compounds yielding chlorine, for instance, the sulfonic acid amides or carboxylic acid amides substituted at the nitrogen group by chlorine. The reaction may be carried out in the presence of agents catalyzing chlorination, such as iron chloride, aluminum chloride or iodine. Furthermore, the reaction solutions may be radiated during chlorination with light, especially light having a high proportion of ultraviolet radiation. Moreover, the reaction may proceed in the presence of compounds binding the acid formed in the chlorination process, for instance, sodium carbonate, sodium bicarbonate and sodium acetate.

To remove the dissolved hydrochloric acid and the excess chlorine the solutions are preferably briefly heated to boiling or part of the solvent mixtures is distilled off after completion of the chlorination. The free hydrochloric acid present in the solution may be bound by addition of acid-binding agents, such as sodium carbonate or organic bases, during the isolation step. These acid-binding agents may be employed as such or in form of their aqueous solutions. Isolation of the chlorination products may be accomplished in most various manners, for instance, by evaporating the solvent, by isolating on heated rollers or by introducing into hot water, the polymer remaining in the aqueous solution in form of solid particles.

The products obtained according to the invention may be employed for many applications, for instance, for making plastics, foils, films, fibers and varnishes. Due to their uniform chlorine content the products are distinguished by excellent stability. After prolonged heating to 100° C. no traces of hydrochloric acid could be detected, for instance, in products containing more than 60% chlorine. However, the incorporation of stabilizers within the new products is generally preferred. The chlorination products obtained according to the invention have been found to be effectively stabilized, for instance, by stabilizers usually employed for chlorinated rubber and polyvinyl chloride.

The expressions "ethylene polymers" and "polymers of ethylene" as used throughout the specification shall comprise polymers or copolymers of ethylene as are obtained, for instance, by pressure polymerization of ethylene activated with compounds yielding oxygen or with substances forming radicals. Said expressions further include emulsion-high-pressure-polymers of ethylene and copolymers of ethylene and other vinyl compounds, for instance, vinyl chloride, vinylidene chloride, styrene, butadiene, acrylic acid ester, which are obtained according to the aforesaid processes.

The mixed chlorination products are of special technical importance which are obtained by chlorination of solutions containing polymers or copolymers of ethylene and other high molecular weight compounds absorbing chlorine in accordance with the herein described processes. Examples of such other high molecular weight compounds are, for instance, natural rubber and the polymers of butadiene, styrene, vinyl chloride, isobutylene as well as copolymers thereof. The combined chlorination allows the manufacture of valuable products of new properties. The combination products derived from chlorinated polyethylene and chlorinated natural rubber show excellent film-forming properties, whereas the combination products of chlorinated polyethylene and chlorinated polyvinyl chloride are very suitable for making films of excellent elasticity and hardness properties. Furthermore, the products obtained according to the invention are distinguished by high resistance to chemical influences.

The invention is further illustrated by the following examples without being restricted thereto, the parts being by weight.

Example 1

500 parts of a polyethylene obtained by high-pressure-polymerization are dissolved in a mixture of 6500 parts of carbon tetrachloride and 1500 parts of chloroform under reflux at an internal temperature of 70° C. within two hours. A stream of chlorine is passed through the resultant solution at said temperature until a precipitated sample of the chlorination product shows a chlorine content of above 50%. The solution is cooled and after-stirred for 24 hours. Thereupon a part of the solvent mixture is distilled off for removing the excess chlorine and the dissolved hydrochloric acid and the solution is dropped with stirring onto boiling water, the solvent distilling off and the chlorinated product precipitating as a solid white powder which can be easily filtered and washed neutral. After drying at 80° C. an easily soluble chlorination product with a chlorine content of 63.9% is obtained.

Example 2

Chlorine is passed at 70° C. through a solution of polyethylene prepared according to Example 1 until a chlorine content of about 20% is attained. The solution is cooled to 30° C. and chlorination is completed. The resultant chlorination product is isolated by precipitating with methanol from the chlorination solution which is treated as described in Example 1. After drying the product shows a chlorine content of 66.8%.

Example 3

After briefly masticating with 70 parts of polyethylene 70 parts of natural rubber are dissolved in 2400 parts of a solvent mixture consisting of 20% of chloroform and 80% of carbon tetrachloride at the reflux by heating and stirring. A stream of chlorine is slowly passed through the solution at an internal temperature of 70° C. until a sample of the chlorination product precipitated in boiling water shows a chlorine content of 69%. The chlorination product isolated by following the recipe of Example 1 gives clear solutions in aromatic solvents and shows excellent film-forming properties.

Example 4

Ethylene is polymerized under a pressure of 900 atmospheres at 90° C. in a solution containing 3 parts of the sodium salt of sulfonated, long-chain paraffin hydrocarbons, 1 part of potassium persulfate, 4 parts of hydrogen superoxide and 0.5 part of tributylamine in 100 parts of water. The resultant polymer is isolated from the emulsion by precipitating with sodium chloride and slightly acidifying. The dried polyethylene is dissolved in six times the quantity of chloroform in a closed autoclave which is provided with means for stirring by heating to 75° C. While keeping the temperature at 75° C. chlorine is pressed into the autoclave in a quantity equivalent to that of the polyethylene. After about 12 hours the autoclave is cooled to 25° C. and the excess hydrochloric acid is discharged until the superatmospheric pressure has dropped to atmospheric pressure. After distilling off one-third of the chloroform the clear solution is poured in a closed channel onto flowing, hot water which is circulated by pumping. The chlorination product formed in fine flakes is carried along with the flowing water and collected in a syphon-like storage tank. The solvent vapor evolving at this stage is discharged from the closed channel by a cooler. The product is then finely distributed in water and mixed while stirring with about 5% of phenoxy-propene-oxide calculated on the chlorination product. The product obtained after filtering and drying shows excellent solubility and stability properties.

Example 5

4 parts of a fat alcohol sulfonate, 10 parts of potassium persulfate and 40 parts of hydrogen superoxide are dissolved in 3000 parts of water. After adding 600 parts of vinyl chloride ethylene is introduced under a pressure of 80 atmospheres into the emulsion which is heated to 80° C. The pressure decreases during polymerization. The pressure is increased again to 80 atmospheres by pressing in further quantities of ethylene until polymerization is complete. The degassed emulsion is precipitated and coagulated. 100 parts of the dried copolymer consisting of vinyl chloride and ethylene are dissolved in 400 parts of chloroform and 600 parts of trichloroethylene at 75° C. At said temperature a stream of chlorine is continuously passed through the emulsion with stirring. After completion of chlorination the solution is cooled to room temperature and rendered neutral with dilute soda solution. By dropping the emulsion thus formed onto boiling water, the chlorination product precipitates while the solvent mixture is simultaneously distilled off in form of a white, thread-like product. The product has a chlorine content of above 60%.

We claim:

1. A process for the manufacture of highly chlorinated high molecular weight polymers of ethylene which comprises preparing a solution of said polymers in an inert solvent consisting essentially of (1) chloroform and (2) a member of the group consisting of carbon tetrachloride, trichloroethylene and chlorobenzene mixture and subjecting said solution to the action of chlorine at temperatures from about 70° C. to about 80° C. in the absence of a light catalyst, the reaction being carried out entirely in solution.

2. A process for the manufacture of highly chlorinated high molecular weight polymers of ethylene which comprises preparing a solution of a copolymer of ethylene with a compound of the group consisting of vinyl chloride, vinylidine chloride, styrene and butadiene in an inert solvent consisting essentially of (1) chloroform and (2) a member of the group consisting of carbon tetrachloride, trichloroethylene and chlorobenzene mixture and subjecting said solution to the action of chlorine under atmospheric pressure and at temperatures from about 70° C. to about 80° C. in the absence of a light catalyst, the reaction being carried out entirely in solution.

3. A process for the manufacture of highly chlorinated high molecular weight polymers of ethylene which comprises preparing a solution of polyethylene in an inert solvent consisting essentially of (1) chloroform and (2)

a member of the group consisting of carbon tetrachloride, trichloroethylene and chlorobenzene mixture and subjecting said solution to the action of chlorine at temperatures from about 70° C. to about 80° C. in the absence of a light catalyst, the reaction being carried out entirely in solution.

References Cited in the file of this patent

UNITED STATES PATENTS

| | | |
|---|---|---|
| 2,352,525 | Evans | June 27, 1944 |
| 2,481,188 | Babayan | Sept. 6, 1949 |
| 2,581,927 | Briant | Jan. 8, 1952 |